United States Patent
Benoit et al.

(10) Patent No.: US 9,415,364 B2
(45) Date of Patent: Aug. 16, 2016

(54) FACILITY AND REACTOR FOR DIRECTLY SYNTHESIZING HYDROCHLORIC ACID FROM HYDROGEN AND CHLORINE WITH HEAT RECOVERY

(75) Inventors: Jérémie Benoit, Vandoeuvre les Nancy (FR); Jérôme Mellard, Dommartin sous Amance (FR)

(73) Assignee: MERSEN FRANCE PY SAS, Pagny sur Moselle (FR)

( * ) Notice: Subject to any disclaimer, the term of this patent is extended or adjusted under 35 U.S.C. 154(b) by 561 days.

(21) Appl. No.: 14/008,565

(22) PCT Filed: Mar. 22, 2012

(86) PCT No.: PCT/FR2012/050601
§ 371 (c)(1),
(2), (4) Date: Nov. 27, 2013

(87) PCT Pub. No.: WO2012/131236
PCT Pub. Date: Oct. 4, 2012

(65) Prior Publication Data
US 2014/0079600 A1 Mar. 20, 2014

(30) Foreign Application Priority Data
Mar. 31, 2011 (FR) ...................................... 11 00989

(51) Int. Cl.
*C01B 7/00* (2006.01)
*C01B 7/01* (2006.01)
(Continued)

(52) U.S. Cl.
CPC ................ *B01J 12/005* (2013.01); *B01J 19/02* (2013.01); *C01B 7/012* (2013.01); *C22C 19/00* (2013.01);
(Continued)

(58) Field of Classification Search
CPC .......... B01J 12/00; B01J 12/005; B01J 19/00; B01J 19/02; B01J 19/24; B01J 2219/00049; B01J 2219/00051; B01J 2219/00074; B01J 2219/00076; B01J 2219/00081; B01J 2219/00087; B01J 2219/00094; B01J 2219/00157; B01J 2219/00159; B01J 2219/02; B01J 2219/0204; B01J 2219/0236; F28D 7/00; F28D 7/0041; F28D 7/0066; C22C 19/00; C22C 19/03–19/051; C22C 19/055–19/058; C22C 38/06; C22C 38/18; C22C 38/40; C22C 38/50; C22C 38/08; Y02P 20/00–20/122; Y02P 20/124; C01B 7/00–7/012; C01B 7/017
See application file for complete search history.

(56) References Cited

U.S. PATENT DOCUMENTS 2,444,256 A * 6/1948 Hill .......................... C01B 7/012
                                                     423/487
3,085,860 A * 4/1963 Hartmann ................ C01B 7/01
                                                     422/611

FOREIGN PATENT DOCUMENTS

DE 1 08 493 3/1898
DE 506 634 9/1930
(Continued)

OTHER PUBLICATIONS

Machine translation of EP 497712 A1, provided in IDS filed Oct. 8, 2013 and published Aug. 5, 1992.*

*Primary Examiner* — Natasha Young
(74) *Attorney, Agent, or Firm* — Todd A. Vaughn; Jordan IP Law, LLC

(57) ABSTRACT

A reactor for the synthesis of gaseous HCl from chlorine and hydrogen, including a convector and a furnace having in a bottom portion a burner supplied with chlorine and hydrogen in order to form gaseous HCl. The convector is arranged coaxially above the furnace, and includes a plurality of tubes in contact with a heat-transport fluid, the reactive gases of the furnace passing through the tubes. The heat-transport fluid flows in the space between the tubes, with a perforated tubular plate whereon are attached the tubes of the convector being arranged between the furnace and the convector. All of the inner walls of the reactor in contact with the gaseous HCl are made of a metal alloy, and in the furnace, at least one portion of the inner surfaces of the walls in contact with the gaseous HCl is made of an alloy comprising at least 20 wt % nickel.

20 Claims, 2 Drawing Sheets

Figure 1:
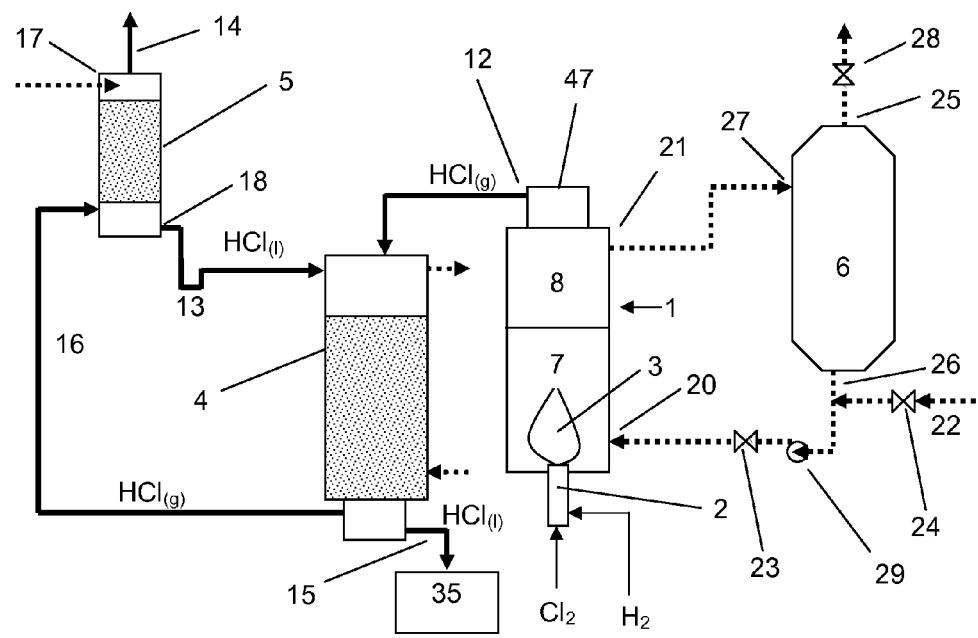

(51) Int. Cl.
  B01J 19/00     (2006.01)
  B01J 19/02     (2006.01)
  B01J 19/24     (2006.01)
  B01J 12/00     (2006.01)
  F28D 7/00      (2006.01)
  C22C 19/00     (2006.01)
  C22C 19/05     (2006.01)
  C22C 38/06     (2006.01)
  C22C 38/50     (2006.01)
  C23C 30/00     (2006.01)
  F28D 7/16      (2006.01)
  C22C 19/03     (2006.01)
  C22C 38/00     (2006.01)
  C22C 38/08     (2006.01)
  C22C 38/18     (2006.01)
  C22C 38/40     (2006.01)

(52) U.S. Cl.
  CPC ............... *C22C 19/05* (2013.01); *C22C 19/051* (2013.01); *C22C 19/055* (2013.01); *C22C 19/056* (2013.01); *C22C 19/057* (2013.01); *C22C 19/058* (2013.01); *C22C 38/06* (2013.01); *C22C 38/50* (2013.01); *C23C 30/00* (2013.01); *F28D 7/0041* (2013.01); *F28D 7/0066* (2013.01); *F28D 7/16* (2013.01); *B01J 2219/00081* (2013.01); *B01J 2219/00094* (2013.01); *B01J 2219/00157* (2013.01); *B01J 2219/00159* (2013.01); *B01J 2219/0236* (2013.01); *Y02P 20/124* (2015.11)

(56) References Cited

FOREIGN PATENT DOCUMENTS

| | | |
|---|---|---|
| DE | 857 343 | 11/1952 |
| EP | 0 103 863 B1 | 3/1984 |
| EP | 0 497 712 B1 | 8/1992 |
| EP | 1 671 926 A1 | 6/2006 |
| FR | 938 010 | 9/1948 |
| FR | 2 525 202 | 10/1983 |
| FR | 2 628 092 | 9/1989 |
| JP | 4 006247 | 1/1992 |
| WO | WO 01/25143 | 4/2001 |

* cited by examiner

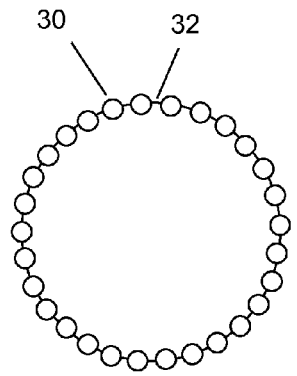
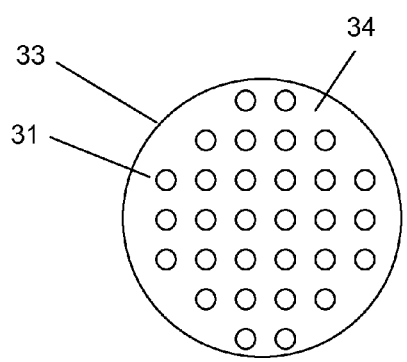
Figure 3a
Figure 3b
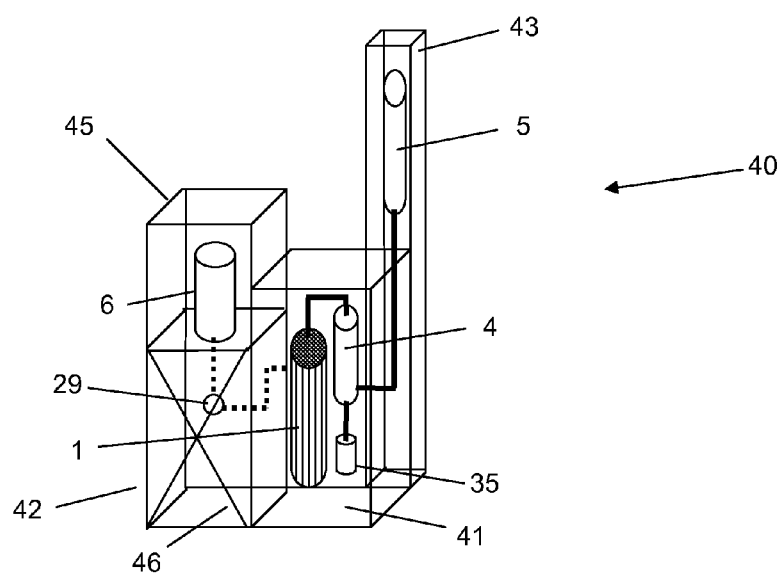
Figure 4

FACILITY AND REACTOR FOR DIRECTLY SYNTHESIZING HYDROCHLORIC ACID FROM HYDROGEN AND CHLORINE WITH HEAT RECOVERY

CROSS-REFERENCE TO RELATED APPLICATIONS

The present application is a National Stage Application of PCT International Application No. PCT/FR2012/050601, now WO 2012/131236, (filed on Mar. 22, 2012), under 35 U.S.C. §371, which claims priority to French Patent Application No. 1100989 (filed on Mar. 31, 2011), which are each hereby incorporated by reference in their respective entireties.

TECHNICAL FIELD OF THE INVENTION

The invention relates to the field of chemical engineering, and more particularly to a facility and a reactor for directly synthesizing gaseous hydrochloric acid via the direct reaction between hydrogen and chlorine, which makes it possible to recover at least one portion of the heat from the reaction in the form of pressurized saturated steam.

BACKGROUND

One way for industrially synthesizing hydrochloric acid uses the direct reaction between the hydrogen and the chlorine in gaseous phase:

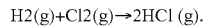

$$H_2(g) + Cl_2(g) \rightarrow 2HCl(g).$$

This reaction is highly exothermic (about 92 kJ/mol HCl produced) and generates a flame temperature of about 2500° C. to 3000° C. Consequently, the reactor must be cooled constantly, typically by a fluid such as water or steam. The consumption in cooling water of such a unit for directly synthesizing hydrochloric acid is substantial.

Generally, such a method comprises two steps:
(i) the formation of gaseous HCl in a reactor (also referred to as "furnace") by the reaction indicated hereinabove,
(ii) the absorption of this gas in water in an absorber in order to produce liquid hydrochloric acid.

The furnace for synthesizing and the absorber must be cooled. The same also applies for the liquid acid resulting from the method. The use of the residual heat of the method is an important factor for its economic assessment.

European Patent application EP 1 671 926 A1 (SGL Carbon AG) describes a method for recovering the heat coming from a furnace for directly synthesizing HCl wherein the cooling water is used as a solvent or as a reactant in another process. However, the high-pressure steam is of a more universal use in an industrial site, and it would be desirable to be able to use a maximum of the residual heat of the method for directly synthesizing HCl in this form.

Such reactors are described in many documents (for example, patent application DE 1 08 493 (Siemens Planiawerke)), and such synthesizing units exist on the market.

Patent application FR 2 525 202 (Le Carbone Lorraine) describes a device that aims, via a judicious choice of the temperatures of the cooling fluids in the various zones of the furnace and of the absorber, to improve the heat recovery rate in the form of pressurized steam.

European Patent EP 0 103 863 B1 (Le Carbone Lorraine) describes a unit for synthesizing wherein the burner is located in the top portion, with the flame being directed downwards, and wherein the absorption water of the gaseous HCl trickles on the inner walls of the reactor, becoming enriched progressively with HCl, and wherein the cooling water flows in counter-current and cools the walls of the reactor, which are provided with heat exchange blocks and tubes. Introducing water into the chamber of the reactor generates corrosion problems which call for the use of graphite as construction material for the reactor.

French Patent application FR 2 628 092 (Sigri GmbH) describes a furnace for directly synthesizing hydrochloric acid wherein a heat-transport fluid flows between a heat exchanger which forms the wall of the median segment of the furnace and a steam generator in order to generate saturated steam at a temperature between 170° C. and 230° C. and a pressure of at least 7 bar.

In accordance with the prior art, the furnace and the absorber are made of graphite, as is described in aforementioned document FR 2 525 202. European Patent EP 0 497 712 B1 describes a furnace entirely made of graphite, marketed under the name USL by the company Le Carbone Lorraine.

Historically, ceramic then metal materials were used (see patents DE 506 634 (Rohm & Haas), FR 938 010 (Societa elettrica ed elettrochimica del Caffaro) and DE 857 343 (Chlorberag)). However, the use of metal results in constraints in choosing temperatures inside the furnace. Indeed, according to the teaching of aforementioned document FR 2 628 092, steel can be used for the hottest portion of the furnace, but as soon as there is a risk of water condensation (i.e. formation of liquid hydrochloric acid), graphite must be used in order to prevent corrosion of the elements of the furnace. Graphite is a material that can be machined easily, but pipes arranged in this material do not resist high pressure; in practice this pressure is limited to about 3.5 bars (see for example FR 2 525 202) which corresponds to a steam temperature of about 134° C. The device described in document FR 2 628 092 extracts the heat solely from a median section of the furnace; this section forms a heat exchanger and is made of metal, which allows to obtain higher pressures of about 7 bars.

Document WO 01/25143 (Norsk Hydro ASA) describes a synthesis reactor with recovery of the heat in the form of high-pressure steam; this reactor comprises a furnace section, a convector section and an absorber, and is made from metal materials. This reactor is characterized by an elbow, with the convector section located laterally offset in relation to the furnace, and the absorber located next to the furnace.

In accordance with the description of the patent application, this is not an embodiment but a project, and consequently, very few constructive details are provided.

The presence of an elbow allows for a particularly compact construction and in particular limits the total height of the facility, which lightens its total weight. However, the presence of an elbow requires flanges, which has disadvantages. A flange requires a suitable seal and requires maintenance. A flange always has a risk of a cold spot, and therefore a risk of condensation, leading to a risk of corrosion through the local formation of liquid hydrochloric acid. A horizontal flange finally has a risk of mechanical stress, in particular in the presence of thermal cycles, that can lead to a rupture.

This invention aims to overcome certain disadvantages of known reactors and facilities. A reactor or a facility is sought making it possible to manufacture concentrated hydrochloric acid (up to a concentration of 38%) and to generate saturated steam with a pressure of at least 7 bars (obtained at 143° C.), preferably at least 10 bars (at 165° C.), more preferably at least 14 bars (at 195° C.) and more preferably at least 16 bars (at 201° C.). This reactor or this facility must have a lifespan and maintenance intervals as long as possible, and must therefore resist uniform corrosion as best as possible. In order to be able to operate in optimum safety conditions, it must not have any risk of localized corrosion, in particular through the formation of cold spots, and it must generally be robust, reliable and durable. As such, it is desired to minimize in particular mechanical tension and stress which are reinforced by any thermal cycles, as well as creeping which is able to limit the lifespan of the reactor or of some of its components.

SUMMARY

A first subject-matter of the invention is a reactor for the synthesis of gaseous HCl from chlorine and hydrogen, comprising a bottom so-called furnace portion and a top so-called convector portion, said furnace comprising in its bottom portion a burner which is supplied with chlorine and hydrogen in order to form gaseous HCl, said convector being arranged coaxially above said furnace, and said convector comprising a plurality of tubes in contact with a heat-transport fluid, with the reactive gases of the furnace passing through said tubes, said heat-transport fluid flowing in the space between said tubes, a perforated tubular plate whereon the tubes of the convector are attached being arranged between the furnace and the convector, said reactor characterized in that all of the inner walls of said reactor in contact with the gaseous HCl are made of a metal alloy, and in that in said furnace, at least one portion of the inner surfaces of the walls in contact with the gaseous HCl is made of an alloy comprising at least 20 wt % nickel, and preferably all of the inner surfaces of the walls in contact with the gaseous HCl. More preferably, the alloy comprises at least 25 wt % nickel, and more preferably at least 30 wt % nickel.

In a particular embodiment, the inner surfaces of the inner walls of the furnace in contact with the gaseous HCl, and preferably all of these inner surfaces, are made of an alloy comprising at least 20 wt % nickel, preferably at least 25% nickel, and more preferably at least 30% nickel.

In a particular embodiment, said surfaces made of alloy comprising at least 20% nickel were carried out by a lining with this alloy, deposited preferably via the overlay welding technique, via plating, loose lining, brazing, supersonic flame projection, or via plasma transferred arc welding. Their minimum thickness is 2 mm, and preferably 3 mm.

The furnace in the reactor in accordance with the invention has bottom portion referred to as combustion chamber which has a substantially cylindrical shape and surrounds the burner. Said combustion chamber can be separated from said furnace. It has a double metal wall, with a heat-transport fluid flowing between the two walls.

The reactor in accordance with the invention has a top portion of tapered shape which thins upwards, with an outlet arranged in the shape of an elbow, said top portion having a double metal wall, with a heat-transfer fluid flowing between the two walls. In an alternative, the circuit of the heat-transport fluid flowing between the walls of said combustion chamber is connected to the circuit of the heat-transport fluid flowing between the walls of said top portion of the reactor.

A second subject-matter of the invention is a furnace for such a reactor, or a furnace in such a reactor, which has the technical characteristics mentioned hereinabove.

A third subject-matter is a combustion chamber for a furnace for such a reactor, or a combustion chamber in such a reactor, characterized in that it:

has a substantially cylindrical shape and surrounds the burner, can be separated from said furnace, has a double metal wall in such a way that a heat-transfer fluid can flow between the two walls.

A fourth subject-matter of the invention is a facility for the synthesis of gaseous HCl, comprising a reactor as described hereinabove, said reactor comprising a furnace and a convector as described hereinabove, and in addition: an absorber wherein said gaseous HCl is dissolved in an aqueous phase in order to form liquid HCl, a tail column wherein the residual gases exiting the absorber are purified before they are released into the atmosphere, a heat-transport fluid system in contact with said furnace and said convector, and a pressurized steam tank wherein said heat-transport fluid is expanded for the purposes of distributing it to one or several consumption areas.

For the reactor, the furnace or the facility in accordance with the invention, said alloy comprising at least 30 wt % nickel can be selected from the group consisting of:

(i) nickel-based alloys comprising 14 to 17% Cr, from 6 to 10% Fe, at most 1.0% Mn, at most 0.5% Si, at most 0.5% Fe; the rest being nickel of which the content must be at least 72%, with the content of the other elements being, within the indicated limits, such that the total reaches 100%;

(ii) nickel-based alloys comprising from 19 to 23% Cr, from 7 to 11% Mo, from 3 to 6% Fe, at most 0.5% Si, at most 0.5% Mn, at most 0.4% Ti, at most 0.4% Al, at most 3.7% Ta; the rest being nickel of which the content must be at least 60% Ni, with the content of the other elements being, within the indicated limits, such that the total reaches 100%;

(iii) nickel-based alloys comprising between 20 and 23% Cr, between 8 and 10% Mo, between 3.15 and 4.15% Nb (able to also contain Ta), at most 5% Fe and at most 1% Co, and able to further include at most 0.50% each element Mn, Al, Si, Ti, at most 0.10% C, and at most 0.15% each element P and S; the rest being nickel of which the content must be at least 58%, with the content of the other elements being, within the indicated limits, such that the total reaches 100%; and (iv) Fe-based alloys comprising between 30 and 35% Ni, between 19 and 23% Cr, at most 0.10% C, between 0.15 and 0.60% Al and between 0.15 and 0.60% Ti; the rest being iron of which the content must be at least 39%, with the content of the other elements being, within the indicated limits, such that the total reaches 100%.

Another subject-matter of the invention is a facility in accordance with the invention, characterized in that it comprises three units, i.e.: (i) the reactor unit comprising the reactor and the absorber; (ii) the steam unit comprising the tank and possibly the circulation pump, and (iii) the unit for purifying effluents comprising the tail column, and characterized in that each of said three units is contained in a dedicated rigid external metal structure, in such a way as to facilitate the transport of the three units (i.e. of the three metal structures representing the three units) to the place of facility, their setting in place as well as their connecting together and to the external networks.

A last subject-matter in accordance with the invention is a reactor unit for a facility as described hereinabove, comprising the reactor as described hereinabove as well as an absorber.

DRAWINGS

Embodiments of the invention will be explained below in closer detail by reference to the drawings, wherein.

FIG. 1 diagrammatically shows a facility in accordance with the invention. The solid lines symbolize an HCl pipe (gaseous or liquid). The square dotted lines symbolize pipes of the high-pressure steam circuit, which contain pressurized steam or the cooling water. The circular dotted lines symbolize pipes of the low-pressure cooling circuit.

Figure 2:
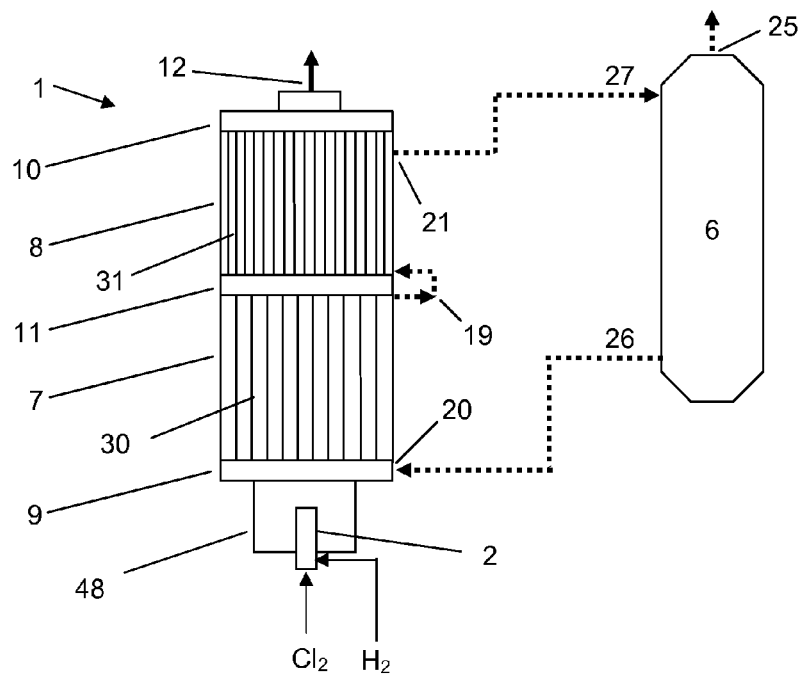

FIG. 2 diagrammatically shows the reactor and in more detail.

FIGS. 3a and 3b diagrammatically show a horizontal cross-section through the section of the furnace (FIG. 3a) and the collector section (FIG. 3b) of the reactor.

FIG. 4 diagrammatically shows a facility in accordance with the invention.

DESCRIPTION

In reference to FIG. 1, the facility in accordance with the invention comprises a vertical reactor 1 with a typically cylindrical shape and closed at its two ends (closed except for the supply with gas and the evacuation of the reactive gases), said reactor 1 comprising a bottom portion 7 referred to as furnace and a top portion 8 referred to as convector. The furnace 7 comprises in its bottom portion the combustion chamber 48 (shown only in FIG. 2) which comprises in its bottom portion the burner 2. The latter comprises a chlorine inlet and a hydrogen inlet; at its top end the flame 3 is developed that burns the chlorine and the hydrogen in order form gaseous HCl. This gas exits the reactor 1 in the vicinity of its top end via an outlet 12 towards the absorber 4, installed next to the reactor 1. In the absorber 4, the gaseous HCl is absorbed in water or in a dilute aqueous solution of HCl. A more or less concentrated aqueous solution of HCl is as such formed, here called "liquid HCl"; it exits the absorber 4 via an outlet 15 arranged in its bottom portion, which leads to a normal pressure reservoir 35. Advantageously, this aqueous solution is a saturated solution (referred to as "concentrated hydrochloric acid").

The residual gases can still comprise HCl and are conveyed through a pipe 16 into a washing tower referred to as "tail column" 5, where they undergo a washing with water that enters into the tail column 5 via an inlet 17 arranged in its top portion; the resulting diluted solution of hydrochloric acid exits the tail column 5 via an outlet 18 arranged in its bottom portion and supplies the absorber 4. The residual gas 14 that exits from the tail column 5 has a content in HCl that is so low that it can be emitted into the atmosphere in the strict respect of environmental standards.

In FIG. 1, the grayed zone in the absorber 4 and the tail column 5 symbolize a zone of interaction between the aqueous phase and the gaseous phase, leading to the dissolution of the gaseous HCl in the aqueous phase. The absorber 4 can be a block exchanger of a known type, typically made of graphite (for example Graphilor®).

The reactor 1 is cooled by a heat-transport fluid circuit which comprises an inlet 20 close to the base of the furnace 7, and an outlet 21 in its top portion. The heat-transport fluid that exits the steam circuit via this outlet 21 is collected in a tank 6 through an inlet 27. The heat-transport fluid is typically hot water, possibly mixed with pressurized steam. It is expanded in the tank 6 and can be taken from the bottom portion of the tank 6 via a pipe 26 and be reinjected into the cooling water circuit, possibly mixed with cool liquid (for example cool water) that enters the system via a supply 22 through a valve 24; this mixture is put into circulation by a circulation pump 29 through a valve 23 and returned by an inlet 20 in the tubular cooling system of the furnace 7 of the reactor 1, as is diagrammatically shown in FIG. 1. An outlet 25 arranged in the tank 6 and protected by a valve 28 allows the pressurized steam to exit to a consuming area or a distribution network.

FIG. 2 more especially shows the cooling system of the reactor 1. The inlet 20 and the outlet 21 are arranged in collectors 9, 10, which can be flat substantially cylindrical-shaped parts wherein are inserted the vertical tubes 30, 31 which form the tubular cooling system of the furnace 7 and of the top portion 8 of the reactor 1. An intermediary collector 11, typically with a substantially cylindrical shape, receives the tubes 30, 31 of the furnace 7 and of the top portion 8 of the furnace; a bridge 19 connects these two heat-transfer circuits together. The bottom 9 and intermediary 11 collectors advantageously have the shape of a tube forming a crown, wherein are arranged the flanges for the entering and exiting of the heat-transport fluid.

The cooling system of the furnace 7 comprises a plurality of vertical tubes 30 which surround the furnace 7 or, preferably, form its external wall. The heat-transport fluid flows inside these tubes 30; the heat transfer is accomplished mainly via thermal radiation.

The cooling system of the top portion 8 (referred to as "convector") of the reactor 1 comprises a plurality of tubes 31 which are located inside of the volume delimited by the wall of said top portion (convector) 8 of the reactor 1 (FIG. 3a); this type of convector is known as "shell and tube". The reactive gases flow in these tubes 31, while the heat-transport fluid flows to the outside, confined by the external wall 33 of the convector 8; the heat transfer is accomplished mainly via convection. Said tubes 31 are attached, preferably by an annular weld seam, onto a perforated metal plate (referred to as "tubular plate") of the intermediary collector 11 and extend to the top collector 10, where they are attached, also preferably by welding, onto a second tubular plate. The tubular plate of the intermediary collector 11 forms a support for the tubes 31 of the convector 8 and channels the flow of reactive gases into said tubes 31. As such the tubes 31 of the convector 8 form a cluster which extends through all of the volume of the top portion 8, while leaving between two neighboring tubes 31 an inter-tubular space 34 that is sufficient for the heat-transport fluid to flow (FIG. 3b). (Contrary to what FIG. 2 suggests, the tubes 31 cannot be seen from the outside.) This inter-tubular space 34 can comprise baffles, for example horizontal slats or plates, in order to modify the flow of the heat-transfer fluid for the purpose of improving the heat exchange.

In the method in accordance with the invention, the temperature of the reactive gases inside the reactor 1 can reach about 2000° C. to 2600° C. in the bottom portion of the furnace 7, about 180° to 280° C. (and typically about 250° C.) at the top 47 of the top portion of the convector 8, and about 800° C. to 1000° C. (and typically about 900° C.) on intermediary collector 11. The pressure in the reactor 1 (i.e. the pressure of the reactive gases) is about 0.5 bar. The temperature therefore decreases from the bottom upwards of the reactor 1.

The cooling fluid (heat-transport fluid) first passes through the tubes 30 which surround the furnace 7, then through the bridge 19 and between the tubes 31 which occupy a portion of the volume of the top portion 8 of the reactor. Said tubes 30, 31 are preferably metal tubes without longitudinal weld.

As the reactor 1 in accordance with the invention has a generally cylindrical shape, the furnace 7 and the convector 8 are located on the same axis. The reactive gases therefore rise as they are cooled from the flame 3 to the outlet 12, and move about in an enclosure closed by a set of smooth metal walls without zones able to form a cold spot or trap moisture.

The temperature of the inner wall decreases from the bottom upwards. It is advantageous for it to not bee too high, in order to limit generalized corrosion and in order to recover a maximum amount of heat. But it must not be too low in order to prevent condensation of liquid acid. In an advantageous embodiment, the temperature of the inner wall is always at least equal to 180° C. and between 180° C. and 300° C.

The hottest spot of the inner walls of the reactor 1 is located on or just above the combustion chamber 48; advantageously the temperature therein is between 230° C. and 280° C., preferentially about 250° C.

The coldest spot of the reactor is at the top 47, and at this location, the inner wall temperature of the reactor 1 does not fall below 180° C. and is located advantageously between 180° C. and 250° C.; a minimum value of about 210° C. is preferred. In certain cases, it may even be useful to heat the top 47 in order to prevent condensation.

Thanks to its vertical construction, the reactor 1 in accordance with the invention, of which the total height is typically about 12 to 15 meters, can be assembled in the workshop and delivered as a single unit in a rigid metal structure; this simplifies its installation and setting into place on the site. This reactor unit 41 comprises advantageously the absorber 4, which will then be installed vertically next to the reactor 1 as diagrammatically indicated in FIG. 4.

The use of a cooling system in the top portion 8 of the reactor 1 which contributes to heating the pressurized steam allows for a thermal performance that is much better than known systems.

In accordance with another aspect of the invention, the walls of the furnace 7 are in contact with tubes 30 wherein a heat-transport fluid flows, or are formed by these tubes 30. Advantageously, the inner wall of the furnace 7 comprises vertical tubes 30, or is comprised of vertical tubes 30 connected together directly to one another or by the intermediary of bars welded 32 to said tubes 30 over their entire length. The FIG. 3a shows an advantageous embodiment. Any other means of heat exchange can be used in the scope of this invention.

The bottom portion of the furnace 7 which surrounds the burner 2, referred to as combustion chamber 48, is also cooled by a heat-transport fluid; advantageously this is a circuit that is different from that which has just been described. This heat can also be recovered in the form of steam, in the form of hot water, or any other suitable form. In a particular embodiment, the combustion chamber 48 (diagrammatically visible in FIG. 2) is a cylindrical part that can be separated from the furnace 7, connected to the latter by a circular flange (not shown in the figures). This allows it to be exchanged in the case of wear and tear. Advantageously, it is made of carbon steel or of stainless steel. More advantageously, its inner wall which is in contact with the reactive gases is either lined on the inside or made entirely of alloys comprising at least 20 wt % nickel, as those described hereinbelow. In FIG. 2, this combustion chamber 48 which can be separated is located below the bottom collector 9. It surrounds the burner 2. Its outer diameter can be identical, greater or less (and preferably less) than that of the bottom collector 9 and/or the bottom portion of the furnace 7. An alloy comprising at least 25 wt % nickel is preferred, and more preferably at least 30 wt % nickel. In a preferred embodiment, the combustion chamber 48 has a double metal wall. In an alternative of this embodiment, the inner wall (in contact with the reactive gases) is made of alloys of at least 20% (preferably at least 25% and more preferably at least 30%) of nickel as described for the other inner walls of the reactor 1.

In the double-wall combustion chamber (48), a heat-transfer fluid flows between the two walls. This heat-transfer fluid can be conveyed through circuits and devices that make it possible to recover the heat that it contains.

The burner 2 is designed in such a way as to produce a flat flame (spread out). This objective is achieved by a burner 2 having a burner head (not shown in the figures) that has a substantially cylindrical shape, with a tapered gas outlet section; in this outlet section a plurality of openings, preferably circular, are arranged through which flow the gaseous mixture of chlorine and hydrogen.

In accordance with another aspect of the invention, the reactor 1 is made of metal. More precisely, at least all of the surfaces in contact with the reactive gases are made of metal. Carbon steel can be used which has a sufficient resistance to corrosion by the gaseous HCl. In this case, it is preferred that at least one portion of the inner surface of the furnace 7 (and more especially its bottom portion, at least over a height of about 1.5 to 2.5 meters starting from the top edge of the combustion chamber 48) be lined with a alloy comprising at least 20% nickel (all of the percentages of metallurgical compositions are given here in percentages by weight), preferably at least 25% nickel, and more preferably at least 30% nickel.

In an advantageous embodiment, the alloy comprises in addition to the at least 20%, 25% or 30% nickel: at least 14% chromium and at least 4.5% iron. As such, said alloy can advantageously be selected from the group consisting of: (i) nickel-based alloys comprising at least 72% Ni, from 14 to 17% Cr, from 6 to 10% Fe, at most 1.0% Mn, at most 0.5% Si, at most 0.5% Fe; (ii) nickel-based alloys comprising at least 60% Ni, from 19 to 23% Cr, from 7 to 11% Mo, from 3 to 6% Fe, at most 0.5% Si, at most 0.5% Mn, at most 0.4% Ti, at most 0.4% Al, at most 3.7% Ta; (iii) Fe-based alloys comprising at least 39% Fe and between 30 and 35% Ni, between 19 and 23% Cr, at most 0.10% Cn between 0.15 and 0.60% Al and between 0.15 and 0.60% Ti.

More preferably, and excluding the extra initial cost that this solution has, the inner walls of said furnace 7 are made from an alloy comprising at least 14% chromium, at least 4.5% iron and at least 20% nickel (preferably at least 25% nickel, and more preferably at least 30% nickel), and which can be selected from the group defined hereinabove for the linings The alloys Inconel™ 600, Inconel™ 625, Haynes™ 625, Incoloy™ 800H and 800 HT (the alloy Incoloy™ 800 being possible but less preferred) are suitable. Alloys comprising at least 14% chromium, at least 4.5% iron and at least 20% (preferably at least 25%, and more preferably at least 30%) of nickel, and more particularly those mentioned hereinabove and described in reference to their composition or a commercial designation, can also be used for the convector 8, and more particularly for the components in contact with the gaseous HCl (in particular the tubes 31 and the tubular plate 38).

Such a lining can be applied by the overlay welding technique, by plating, by loose lining, by cold spray, by brazing, by High Velocity Oxygen Fuel Spraying (HVOF), by Plasma Transferred Arc Welding (PTA) or by any other suitable technique. In the case where the overlay welding technique, that referred to as PTA or that referred to as HVOF are used, it is preferred to carry out the deposit in two steps or two passes, as at the beginning of the deposit a layer of intermediate composition will form between the metal support and lining, which does not have the resistance to corrosion that is sought.

Advantageously, all of the inner surfaces of the furnace 7 are lined with such an alloy. In an embodiment, this lining extends over a height of at least 1.5 meters in the bottom portion of the furnace 7. It is preferred however that the entire inner surface of the furnace 7 (and preferably also the inner surface of the combustion chamber 48) be lined as such. The minimum thickness of the lining is preferably 2 mm and preferably 3 mm. In accordance with the observations of the inventors, such a lining provides sufficient resistance against corrosion. It is not recommended to operate the reactor with a residual thickness of lining less than 1 mm as the underlying metal risks being attacked at least locally by the reactive gases. In order to extend the lifespan of the lining, an initial thickness of at least 2 mm is preferred, and preferentially of at least 3 mm knowing that due to uniform corrosion, this thickness decreases continuously over the course of the duration of the operation of the reactor. In the case of wear and tear, the walls of the reactor can receive a new lining via one of the described techniques.

In accordance with the invention, the cooling system of the reactor 1 (i.e. the pressure in the tubes 30, 31 of the cooling system) can be operated at a pressure greater than 16 bars (corresponding to a water temperature of about 201° C.). Preferably, it is greater than 20 bar and is preferably between 20 and 23 bars (in this case, the outlet pressure in the tank 6 is advantageously about 15 to 16 bars. With a reactor 1 made entirely from alloys in accordance with one of the three groups indicated hereinabove, a pressure between 30 and 35 bars can even be reached (and expansion in the tank 6 is possible at a pressure of about 17 bars), knowing that the cooling of the reactor 1 is less effective when the pressure (and therefore the temperature of the heat-transport fluid) increases.

In accordance with another aspect of the invention, the top portion 47 (the top) of the reactor 1 advantageously has a tapered shape which thins upwards; the outlet 12 is arranged horizontally and forms an elbow in order to convey the reactive gases to the inlet of the absorber 4, that they travels through from the top downwards. The top 47 and the tube forming the outlet 12 can be made of steel and have a double wall. A heat-transfer fluid can flow between these two walls. As indicated hereinabove, in certain cases it can be useful to heat the top 47 in order to prevent condensation. For this purpose, in a particular embodiment, the circuit of this heat-transfer fluid is connected to that which flows between the walls of the combustion chamber 48: as such the cooling fluid of the combustion chamber 23 becomes a heating fluid for the top 47.

In accordance with another aspect of the invention shown in FIG. 4, the facility 40 in accordance with the invention comprises three units: the reactor unit 41 comprises the reactor 1 itself, such as described hereinabove, as well as the absorber 4. The steam unit 42 comprises the tank 6 and the circulation pump 29. The unit for purifying effluents 43 comprises the tail column 5.

Each unit is contained in a rigid external metal structure. Said rigid external metal structure can be an external frame 45 that is sufficiently rigid, possibly provided with stiffeners 46, which maintains the components (for example the reactor 1 and the absorber 4) in place, and which can be handled in a unitary manner by a means of hoisting, for example by a crane, and transported by any suitable means of land, maritime, river or air transport in a unitary manner.

This modular construction facilitates the transport of the three units to the place of installation as well as their connecting together and to the external networks (not shown in FIG. 6, except for certain pipes for the gaseous and liquid HCl and for the heat-transport fluid).

By way of example, a furnace 7 has been carried out in accordance with the invention with a height of about 9 meters, the tubes 30 made of steel had a length of about 6.5 m and a diameter of about 60 mm. The diameter of the furnace 7 is typically between 0.9 m and 1.6 m. The convector 8 had a height of about 4 m, its diameter is practically identical to that of the furnace 7. The total height of the reactor 1 was about 15.5 m, the top portion 47 of the reactor which covers the convector 8 having a height of about 2.5 m. The inner surfaces of the furnace 7 in contact with the gaseous HCl were lined over a height of 2 m with the Inconel™ 625 alloy, by the overlay welding technique; the thickness of the lining was between 2 and 3 mm in accordance with the location, the height of this lining was about 2 meters starting from the top edge of the combustion chamber 48 which was attached by a flange to the bottom edge of the furnace 7.

| LIST OF REFERENCE NUMERALS | |
|---|---|
| 1 | Reactor |
| 2 | Burner |
| 3 | Flame |
| 4 | Absorber |
| 5 | Tail column |
| 6 | Tank |
| 7 | Furnace |
| 8 | Convector |
| 9, 10 | Collector |
| 11 | Intermediary collector |
| 12 | Gaseous hydrochloric acid outlet |
| 13 | Diluted hydrochloric acid pipe |
| 14 | Residual gas |
| 15 | Concentrated hydrochloric acid outlet |
| 16 | Gaseous hydrochloric acid pipe |
| 17 | Clean water inlet |
| 18 | Diluted hydrochloric acid outlet |
| 19 | Bridge |
| 20 | Cooling water inlet |
| 21 | Pressurized steam outlet |
| 22 | Clean water inlet |
| 23, 24 | Valves |
| 25, 26 | Pressurized steam outlet |
| 27 | Pressurized steam inlet |
| 28 | Valve |
| 29 | Circulation pump |
| 30, 31 | Tubes of the cooling system |
| 32 | Welded bar |
| 33 | External wall of the convector |
| 34 | Inter-tubular space |
| 35 | Liquid HCl reservoir |
| 39 | Opening |
| 40 | Facility |
| 41 | Reactor unit |
| 42 | Steam unit |
| 43 | Unit for purifying effluents |
| 45 | External frame |
| 46 | Stiffener |
| 47 | Top of the reactor |
| 48 | Combustion chamber |

The invention claimed is:

1. A reactor for the synthesis of gaseous HCl, comprising :
a furnace having at a bottom portion thereof a burner which is supplied with chlorine and hydrogen in order to form gaseous HCl;
a convector coaxially arranged above the furnace and having a plurality of spaced apart convector tubes in contact with a heat-transport fluid, the reactive gases in the furnace flowing through the convector tubes and the heat-transport fluid flowing in the spaces between adjacent tubes;
a perforated tubular plate arranged between the furnace and the convector and attached to the convector tubes,
wherein:
the inner walls of the furnace and the convector in contact with the gaseous HCl are made of a metal alloy, and at least one portion of the inner wall surfaces of the furnace walls in contact with the gaseous HCl is made of an alloy comprising at least 30 wt % nickel.

2. The reactor of claim 1, wherein all of the inner wall surfaces of the furnace in contact with the gaseous HCl are made from an alloy comprising at least 30 wt % nickel.

3. The reactor of claim 2, wherein the inner wall surfaces made of an alloy comprising at least 30% nickel comprise a lining.

4. The reactor of claim 3, wherein said lining has a minimum thickness of between 2 and 3 mm.

5. The reactor of claim 1, further comprising a combustion chamber removeably attached to the furnace and which surrounds the burner.

6. The reactor of claim 5, wherein the combustion chamber has a double metal wall through which the heat-transfer fluid flows.

7. The reactor of claim 6, further comprising a top portion having an outlet, the top portion having a double metal wall through which the heat-transfer fluid flows.

8. The reactor of claim 7, wherein a fluid circuit of the heat-transport fluid flowing between the walls of the combustion chamber is fluidically connected to a fluid circuit of the heat-transport fluid flowing between the walls of the top portion.

9. The reactor of claim 1, wherein the alloy comprises nickel-based alloys comprising from 14 to 17% Cr, from 6 to 10% Fe, no greater than 1.0% Mn, at most 0.5% Si, no greater than 0.5% Fe; with the remainder being nickel of which the content must be at least 72%.

10. The reactor of claim 1, wherein the alloy comprises nickel-based alloys comprising from 19 to 23% Cr, from 7 to 11% Mo, from 3 to 6% Fe, no greater than 0.5% Si, no greater than 0.5% Mn, no greater than 0.4% Ti, no greater than 0.4% Al, no greater than 3.7% Ta; with the remainder being nickel of which the content must be at least 60% Ni.

11. The reactor of claim 1, wherein the alloy comprises nickel-based alloys comprising between 20 and 23% Cr, between 8 and 10% Mo, between 3.15 and 4.15% Nb, no greater than 5% Fe, no greater than 1% Co, and no greater than 0.50% of each element Mn, Al, Si, Ti, respectively, no greater than 0.10% C, no greater than 0.15% of each element P and S, respectively; with the remainder being nickel of which the content must be at least 58%.

12. The reactor of claim 1, wherein the alloy comprises Fe-based alloys comprising between 30 and 35% Ni, between 19 and 23% Cr, no greater than 0.10% C, between 0.15 and 0.60% Al, between 0.15 and 0.60% Ti; with the remainder being iron of which the content must be at least 39%.

13. A facility for synthesizing gaseous HCl, comprising:
(i.) a reactor having:
a furnace having at a bottom portion thereof a burner which is supplied with chlorine and hydrogen in order to form gaseous HCl;
a convector coaxially arranged above the furnace and having a plurality of spaced apart convector tubes in contact with a heat-transport fluid, the reactive gases in the furnace flowing through the convector tubes and the heat-transport fluid flowing in the spaces between adjacent tubes;
a perforated tubular plate arranged between the furnace and the convector and attached to the convector tubes;
(ii) an absorber fluidically connected to the reactor and in which the gaseous HCl is dissolved in an aqueous phase in order to form liquid HCl;

(iii) a tail column fluidically connected to the absorber and in which residual gases exiting the absorber are purified before being released into the atmosphere;
(iv) a heat-transport fluid system in contact with the furnace and the convector;
(v) a tank of pressurized steam fluidically connected to the reactor and in which the heat-transport fluid is expanded for distribution to at least one consumption area,
wherein:
the inner walls of the furnace and the convector in contact with the gaseous HCl are made of a metal alloy, and
at least one portion of the inner wall surfaces of the furnace walls in contact with the gaseous HCl is made of an alloy comprising at least 30wt % nickel.

14. The facility of claim 13, wherein all of the inner wall surfaces of the furnace in contact with the gaseous HCl are made from an alloy comprising at least 30wt % nickel.

15. The facility of claim 13, further comprising a combustion chamber removeably attached to the furnace and which surrounds the burner.

16. The facility of claim 15, wherein the combustion chamber has a double metal wall through which the heat-transfer fluid flows.

17. The facility of claim 16, further comprising a top portion having an outlet, the top portion having a double metal wall through which the heat-transfer fluid flows.

18. The facility of claim 17, wherein a fluid circuit of the heat-transport fluid flowing between the walls of the combustion chamber is fluidically connected to a fluid circuit of the heat-transport fluid flowing between the walls of the top portion.

19. A facility for synthesizing gaseous HCl, comprising:
a reactor unit including:
(i) a reactor having:
a furnace having at a bottom portion thereof a burner which is supplied with chlorine and hydrogen in order to form gaseous HCl;
a convector coaxially arranged above the furnace and having a plurality of spaced apart convector tubes in contact with a heat-transport fluid, the reactive gases in the furnace flowing through the convector tubes and the heat-transport fluid flowing in the spaces between adjacent tubes;
a perforated tubular plate arranged between the furnace and the convector and attached to the convector tubes; and
(ii) an absorber fluidically connected to the reactor and in which the gaseous HCl is dissolved in an aqueous phase in order to form liquid HCl;
a steam unit including a tank and a circulation pump fluidically connecting the tank to the reactor and in which the heat-transport fluid is expanded for distribution to at least one consumption area; and
a purifying unit including a tail column fluidically connected to the absorber and in which residual gases exiting the absorber are purified before being released into the atmosphere.

20. The facility of claim 19, further comprising a housing containing the reactor unit, the steam unit and the purifying unit in such a way as to facilitate transport thereof to the place of installation.

* * * * *